United States Patent [19]
Becker et al.

[11] Patent Number: 5,245,258
[45] Date of Patent: Sep. 14, 1993

[54] ELECTRICALLY POWERED POWER WINDOW UNIT

[75] Inventors: Herbert Becker; Gerhard Jürgens, both of Coburg; Klaus Wagner, Gleussen; Gerhard Schelhorn, Coburg; Carsten Brandt, Weidach; Bernd Freisleben, Staffelstein; Reiner Kurzendörfer, Coburg, all of Fed. Rep. of Germany

[73] Assignee: Brose Fahrzeugteile GmbH & Co. Kommanditgesellschaft, Coburg, Fed. Rep. of Germany

[21] Appl. No.: 777,235

[22] PCT Filed: Jun. 23, 1990

[86] PCT No.: PCT/EP90/01024

§ 371 Date: Nov. 7, 1991

§ 102(e) Date: Nov. 7, 1991

[87] PCT Pub. No.: WO91/01060

PCT Pub. Date: Jan. 24, 1991

[30] Foreign Application Priority Data

Jul. 11, 1989 [DE] Fed. Rep. of Germany ....... 3922698

[51] Int. Cl.⁵ .............................................. E05F 15/16
[52] U.S. Cl. .................................... 318/266; 318/10; 318/466
[58] Field of Search .................... 318/9, 10, 11, 12, 14, 318/15, 264, 265, 266, 286, 466, 467, 468, 469, 558

[56] References Cited

U.S. PATENT DOCUMENTS

| | | | |
|---|---|---|---|
| 4,110,676 | 8/1978 | Edick et al. | 322/31 |
| 4,459,518 | 7/1984 | Chevallier | 318/286 |
| 4,523,564 | 6/1985 | Sturdy | 123/361 |
| 4,795,951 | 1/1989 | Gaebel et al. | 318/293 |
| 4,857,812 | 8/1989 | Mochizuki et al. | 318/15 |
| 4,922,171 | 5/1990 | Ohi | 318/471 |

FOREIGN PATENT DOCUMENTS

| | | |
|---|---|---|
| 0149418 | 7/1985 | European Pat. Off. |
| 0194433 | 9/1986 | European Pat. Off. |
| 0252487 | 1/1988 | European Pat. Off. |
| 3021948 | 12/1961 | Fed. Rep. of Germany |
| 3240080 | 5/1984 | Fed. Rep. of Germany |
| 8712863 | 10/1986 | Fed. Rep. of Germany |
| 568679 | 9/1975 | Switzerland |
| 2079540 | 1/1982 | United Kingdom |
| 2174253 | 10/1986 | United Kingdom |

*Primary Examiner*—Bentsu Ro
*Attorney, Agent, or Firm*—Nils H. Ljungman & Associates

[57] ABSTRACT

An electric-motor-driven window operating system for installation in motor vehicle doors with a drive unit (2) arranged in a damp-proof housing (1) and connected to a rotation speed sensor (30) and controllable by an electronic control and regulating unit (4). The electronic control and regulating unit (4), the drive unit (2) and the rotation speed sensor (3; 30, 31, 32) are arranged in a common damp-proof housing (1).

20 Claims, 4 Drawing Sheets

ELECTRICALLY POWERED POWER WINDOW UNIT

DESCRIPTION

The invention relates to a power window unit. The prior art includes electrically powered power window units for raising and lowering the windows of a motor vehicle; these electrically powered power window units are suitable for installation in the doors of motor vehicles and have either an electric motor connected to a transmission or a geared motor as the drive unit, which can be connected to the motor vehicle battery via a switch.

The window, which is mounted in the vehicle door and can be raised or lowered by an electrically powered power window unit, is fastened at its lower edge to a guide carriage slide which can be moved up or down along a profiled rail by means of an closed cable loop, for example. The cable loop goes around a cable drum, which can, for example, be driven by a worm gear transmission by the electric motor in a compact drive unit, which includes the cable drum in addition to the worm gear transmission and the electric motor and is fastened to the supporting surfaces on the inside of the vehicle door or a base plate as well as to the profiled rail.

As an alternative, the drive unit can be used to operate a cross arm window lifter.

Because different forces are necessary to raise and lower the window, the drive unit has an electronic control and regulating system, which is connected to an operating switch, and can also be equipped with a speed sensor. Depending on the position and way the operating switch is used, the window is completely raised, completely lowered or held in a desired intermediate position, whereby the electronic control and regulating system ensures a smooth raising or lowering procedure.

Figure 1:
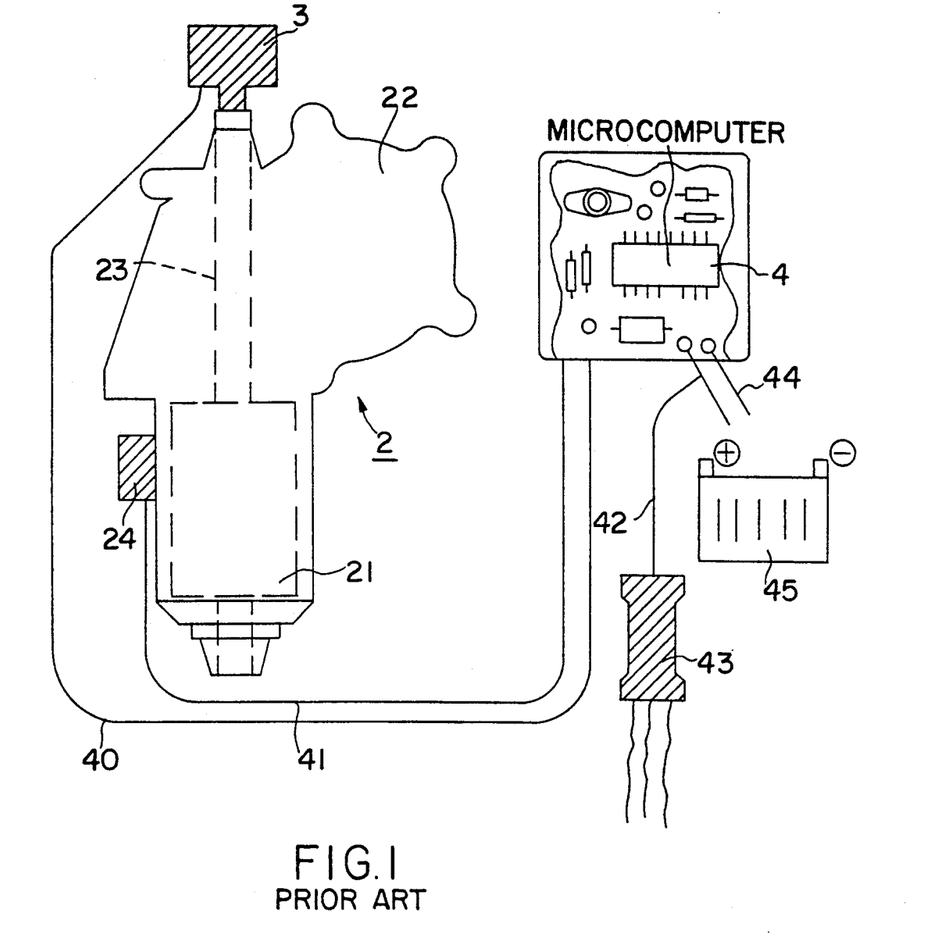
FIG. 1 shows a schematic representation of a configuration of the prior art of an electrically powered power window unit in a motor vehicle door.

A configuration of the prior art for an electrically powered power window unit and an electronic control and regulating system in a motor vehicle door is schematically illustrated in FIG. 1.

The drive unit for this configuration of the prior art consists of a geared motor 2 with an electric motor 21 and a connected transmission 22, which is connected by means not shown here to the cable loop for raising and lowering the window. The rotor shaft 23 is mechanically coupled to a speed sensor 3, which is connected via a conducting cable to the electronic control and regulating system 4 located in a separate housing. The electronic control and regulating system 4 is connected to the power supply of the electric motor 21 via a line 41 and a plug-in contact 24. A line 42 leads to the operating switch in the interior of the vehicle via a plug connector as well as to the motor vehicle battery 45 via a line 44.

As seen in the configuration diagrammed schematically in FIG. 1, the drive unit 2 and the electronic control and regulating system 4 are in separate housings, which must be essentially impervious to moisture; i.e. water vapor which develops must be able to leave the system while liquid. Rain water in particular must not be able to enter through the membrane. Between the separate housings, several cable connections are necessary, for the power supply of the electric motor 21, and for speed measurement for the connection between speed sensor 3 and the electronic control and regulating system 4. The plug-in contacts 24, 43, like the housing to hold the drive unit 2 and the electronic control and regulating system 4 must be impervious to moisture in order to prevent short circuits.

The separate placement of the drive unit 2 and the electronic regulating system 4 thus requires high assembly costs and substantial expenditures for cable connections between the two housings as well as the configuration of moisture tight plugs and jacks. There is a risk that mistakes will be made during establishment of the cable connections between the two housings which results in high overall costs for the installation of the electrically powered power window unit.

An additional problem is that the cables 40, 41, 42 between the separate housings to hold the electronic control and regulating system on one hand and the drive unit on the other hand in the vehicle door move when there is a high degree of moisture, thus requiring complex and expensive seals.

Finally, the subsequent mounting of the housing in the vehicle door requires a large amount of work because two separate mounting procedures must be performed; i.e. there must be separate attachment brackets for fastening to the door wall and an appropriate fastening means.

An additional disadvantage of the prior art is that the speed sensor must be separately mounted on the housing of the drive unit.

DE-GM 87 12 863.2 discloses an electrical machine, consisting of a housing, a front-side end plate and a terminal box, which terminal box has a terminal strip, cable lead openings and a terminal cover with a gasket. In order to minimize the width of the electrical machine and to simplify fabrication, the terminal box of an electrical machine of the prior art is integrated into one of the front-side end plates of the electric machine. As a result, the terminal box has a cavity under the cladding of the shell of the end plate, with an outward-leading hole in the end plate, which is releasably closed by the terminal box.

The terminal cover of the device of the prior art is a rectangular plate and a gasket is integrally connected to the terminal cover. In addition, the terminal strip is integrally connected to the terminal cover and has connecting jacks or pins which can be connected to the cable-side terminal shoes. The cable lead openings are made in the shell of the end plate.

With this device of the prior art, the terminal box is an integral component of the front-side end plate of the electrical machine; however, because of the defined configuration of the terminal box in the front-side end plate, however, a fixed correspondence between the terminal box and the electrical machine is specified, which does not permit a variable configuration of the terminal box and thus of the electronic control system.

The object of the current invention is to create an electrically powered power window unit of the generic type described above, which results in low component and installation costs by eliminating installation errors, guarantees great resistance to moisture without complex and expensive seals and makes possible modular construction, whereby a drive unit can be connected to various, easily accessible and interchangeable electronic control and regulating systems for various motor vehicle types and models.

This object is achieved by the characteristic feature of claim 1.

The solution according to the invention guarantees low component and installation costs by eliminating installation errors, because no additional wiring is needed between the drive unit and the electronic control and regulating system. By locating all parts in a common, moisture tight housing, no additional costs for seals are necessary and inexpensive plug connectors can be used because they are located exclusively in a watertight chamber.

An advantageous refinement of the invention is characterized by the fact that the electronic control and regulating system are located on a circuit board which can be inserted or plugged into a terminal of the common housing, whereby the circuit board can be connected to a plug-in module which can be plugged into an opening in the connector of the common housing and has plug contacts, which can be connected to corresponding mating plug contacts of the drive unit and whereby the plug-in module has an exterior surface which is tight up against the common module.

The modular structure makes possible the use of a specified drive unit for various motor vehicle types and for various embodiments, whereby adaptation to the respective motor vehicle type and type of operation is determined by means of the electronic control system. In this manner, various electronic circuits, such as jamming protection circuits, electronic circuits for control of the raising and lowering of the window and circuits for the control of the windows in association with a central locking system can be used. Guide elements in the housing opening and plug-in module make possible rapid, safe installation, whereby the contact between the electronic control and regulating system and the drive unit is established during insertion, which, on the one hand, guarantees correct polarity and, on the other hand, saves a significant amount of time during installation.

In an alternative embodiment, the circuit board can be inserted into the lockable interior of the connector of the common housing by means of a cover and connected to the mating contacts of the drive unit by means of a contact device.

As an alternative to this, the circuit board can be connected directly to the cover of the common housing and connected to the mating contacts of the drive unit via a contact device. In this embodiment as well, modular design enables the use of various circuit board configurations for various motor vehicle types and embodiments, whereby adaptation to the respective motor vehicle type and type of operation is accomplished via the electronic control system of the circuit board. This ensures a compact design and easy access to the terminal. The desired control function can be realized by installation of the appropriate circuit board.

The alternative connection of the circuit board to the cover makes possible a simple, clear, and space saving configuration.

Analogous to the placement of the electronic control system on a plug-in module, fast, sure installation can be ensured by means of guide elements in the interior of the connector when the electronic control and regulating system is located on a circuit board, whereby the connection between the electronic control and regulating system to the drive unit is made by insertion of the contact device of the circuit board into the corresponding mating contacts of the drive unit, which, on the one hand, guarantees correct polarity and, on the other hand, guarantees a minimal expenditure of time during installation.

An advantageous embodiment of the invention is characterized by the fact that the plug-in module has a receptacle of the speed sensor, which, when the plug-in module is inserted into the common housing, contacts that transmitter part of the speed sensor which is connected to the rotor shaft of the geared motor or is located across from, but not in contact with, the transmitter part of the speed sensor.

This refinement of the invention simplifies speed measurement and eliminates the need for the separate mounting of the speed sensor and its connection to the electronic control and regulating system. The speed can then be measured with or without a wall between the drive unit and the part of the common housing holding the electronic control and regulating system.

An advantageous refinement of the invention is characterized by the fact that the plug-in module consists of a plug-in element containing the electronic control and regulating system, which element is connected on one hand to the outer surface oriented perpendicular to the plug-in element, and which has a plug element opposite the outer surface, which contains the receiver part of the speed sensor and the plug contacts, whereby a power and signal bushing connecting the electronic control and regulating system to a motor vehicle battery and a control switch is located in the outer surface and whereby a gasket is inserted in a groove running on the outer surface around the circumference or a groove in a shoulder of the outer surface.

This refinement eliminates the need for the connection of a cable harness to the drive unit or to the geared motor and, on the other hand, provides a satisfactory contact for the power supply of the drive unit. Furthermore, this embodiment makes possible a speed measurement system which does not suffer from any of the contact and connection problems which can adversely affect proper measurement of speed.

An advantageous configuration of the invention is characterized by the fact that the plug element has a front-mounted, center-stop or lug for the calibration of the receiver parts of the speed sensor, which are located on both sides of the stop surface and the plug contacts adjacent to the stop surface. Because of this, the speed sensor can consist of a Hall sensor, a photoelectric or an inductive sensor as desired.

This configuration guarantees a defined position of the speed sensor and creates the conditions required for contact-free speed measurement. Furthermore, this embodiment of the invention requires a minimal amount of space, resulting in an extremely compact unit overall.

An additional advantageous embodiment of the invention is characterized by the fact that the upper and lower sides of the plug-in element have lugs or tabs which are offset diagonally from one another and which are guided in corresponding guide grooves in a common housing.

The diagonally offset orientation of guide elements on the upper and lower sides of the plug-in element in association with corresponding guide grooves in the common housing facilitate installation and also guarantee a defined location of the plug-in module in the common housing. Furthermore, the guide elements can be used for coding purposes; i.e., a specific layout of the guide elements can be used to ensure the correspondence of specified plug-in modules to the common housing, which prevents the erroneous connection of incompatible electronic control and regulating systems to the drive unit in question.

Finally, an additional advantageous configuration of the invention is characterized by the fact that all of the sealing surfaces are constructed using to two-component technology. Thus, the two-component technology can be employed as early as the injection molding of the individual element, and the application of rubber gaskets is no longer necessary.

The idea upon which the invention is based is explained more closely on the basis of the embodiment illustrated in the accompanying drawings.

Figure 2:
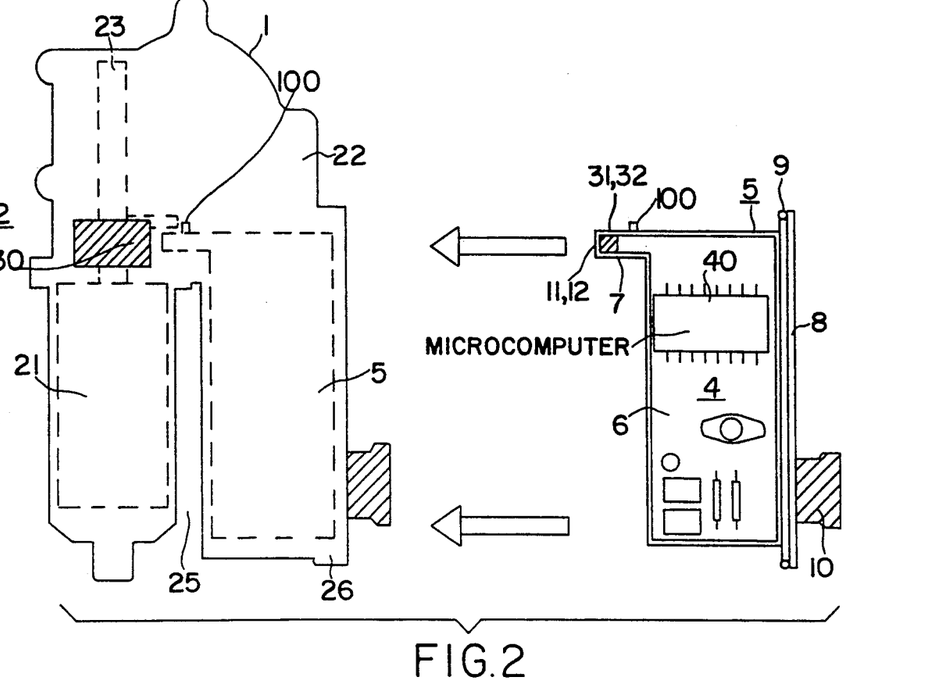
FIG. 2 shows a schematic representation of the assembly according to the invention of an electrically powered power window unit with a separate representation of the plug-in module.

FIG. 2 shows the integrated assembly in a common housing 1 consisting of a drive unit 21 and 22 as well as a plug-in module 5, which contains the electronic control and regulating system 4 as well as the contact device for the power supply of the drive unit and parts of the speed sensor.

As shown in FIG. 2, the plug-in module 5 can be installed completely within the common housing 1 of the assembly and, when installed, is enclosed moisture tight. The plug-in module 5 is inserted into the insertion point in the common housing 1 until it rests against a stop formed by a rib 100. When installed, the exterior wall of the plug-in module 5 forms a firm, moisture tight seal with the common housing 1, so that parts of the assembly inside the common housing 1 are not exposed to any moisture, yet water vapor formed inside can be discharged through the membrane at any time.

In a separate representation, FIG. 2 also shows the structure of a plug-in module 5 which can be inserted in the direction of the two arrows into the insertion point in the common housing 1.

The plug-in module 5 consists of a plug-in element 6, on which the electronic control and regulating system 4, including a micro-computer 40, are mounted. The micro-computer 40 can be programmed as desired, depending on the motor vehicle type in which it is installed. Perpendicular to the plug-in element 6, one exterior wall 8 is connected to the plug-in element 6 on one end, which exterior wall 8, when the plug-in module 5 is installed, forms the outer closure of the plug-in module 5 and is flush with the housing outer wall of the common housing 1.

There is a gasket 9 in a shoulder encircling the exterior wall 8 which, when the plug-in module 5 is installed, forms a moisture tight seal which prevents the penetration of water into the interior of the common housing 1. In the exterior wall 8, there is either a moisture tight cable bushing 10, or a corresponding power or signal plug connection which represents the connection to the control switch as well as to the power supply of the assembly shown in FIG. 2.

On the opposite end of the plug-in element 6 is an elongated plug element 7, which, in the embodiment illustrated, is an extension of the upper side in the area of the upper side of the plug-in module 5. The plug element 7, the configuration of which is shown in more detail in FIGS. 3 and 4 described below, contains on one hand the plug contacts 11, 12 for the power supply of the drive unit, and on the other hand the receiver parts 31, 32 parts of the speed sensor.

To install the electrically powered power window unit assembly with integrated electronic control and regulating system and speed sensor, it is only necessary to insert the plug-in module 5 in the direction of the arrow into the respective opening in the common housing 1 until contact is made with a stop or lug, whereby in this position, the exterior surface 8 of the plug-in module 5 forms a flush closure with the exterior wall of the common housing 1. In this position, contact is also made with the power supply of the drive unit 2, which is located in the common housing 1, as well as a connection between the speed sensor receiver parts 31, 32 located in the plug-in module and the speed sensor transmitter part 30, which is connected to the rotor shaft 23, so that precise speed measurement is guaranteed. This speed measurement is preferably accomplished by means of a contact-free Hall sensor or a photo-electric or inductive measuring device.

Figure 3:
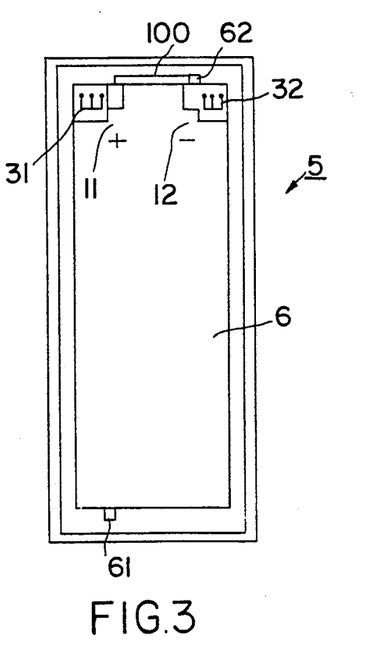
FIG. 3 shows an end view of the plug-in module.
Figure 4:
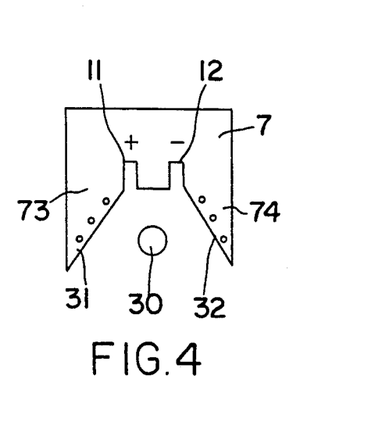
FIG. 4 shows a plan view of the plug-in module.

FIG. 3 shows an end view of the plug-in module 5, while FIG. 4 shows a plan view of the plug-in module 5.

The plug element 7 on the front side of the plug-in module 5 contains a central stop or lug for the calibration of two Hall sensors 31, 32, which are located on both sides of a rib 100. They are located on a beveled surface 73, 74, and partly surround the transmitter part 30 of the speed sensor for an improved electro-magnetic connection.

Between the Hall sensors 31, 32, which form the receiver part of the speed sensor, and the rib 100 for the calibration of the Hall sensors 31, 32, there is one positive and one negative plug contact 11, 12, which, when the plug-in module is fully inserted, can be connected to respective mating contacts, which are connected to the power supply of the drive unit.

In the illustrated embodiment, the plug contacts 11, 12 are designed as tip jacks, into which corresponding projecting plug contacts of the drive unit can be plugged. Of course, the plug contacts 11, 12 on the plug-in module 5 can also be designed as plugs, which can be plugged into the corresponding receptacles of the drive unit.

There are guide tabs 61, 62 oriented diagonally to one another on the upper and lower sides of the plug-in element 6, which slide into the corresponding guide grooves in the housing opening of the common housing 1 and thus make possible safe and correct insertion of the plug-in module 5 into the housing opening. By means of the guide tabs, tilting of the plug-in module 5 during insertion is prevented and a drawer effect is thus created; however, the guide tabs 61, 62 can also be used for coding of the plug-in module 5, so that a micro-computer programmed in a specified way can only be used for a specified drive unit.

Figure 5:
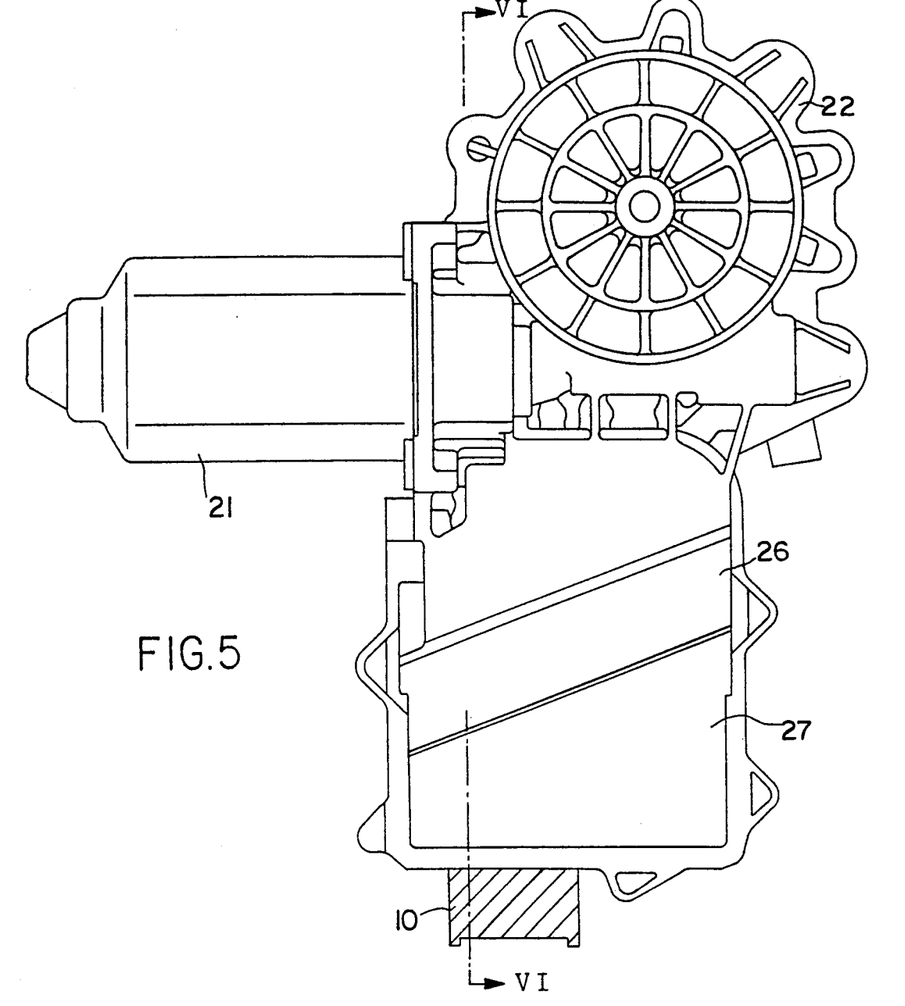
FIG. 5 shows a plan view of the drive unit of an electrically powered power window unit with the connector of an assembly oriented at right angles to the drive unit.
Figure 5A:
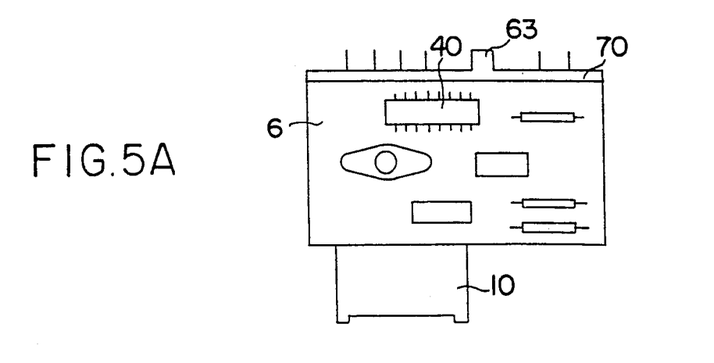

FIG. 5 shows a plan view of a variant of the invention with a connector 26 of the common housing 1 offset at an angle from the drive unit 21, 22.

In this embodiment, the circuit board which holds the electronic control and regulating system 4 is not inserted into the common housing from an end of the connector, but is inserted into the connector 26 through the top or bottom. A cover 27 which covers the connector 26 can either be opened on a hinge, lifted off or moved horizontally, so that the interior of the connector 26 is free to accept the circuit board 6.

As an alternative to this, the circuit board 6 can be directly fastened to the inner surface of the cover 27, which results in a space-saving design which is easy to inspect.

Not shown in greater detail are mating contacts in the connector 26 which are used to establish a connection to a contact device 70 having several connecting pins, which are connected to the electronic control and regulating system 4 of the circuit board 6.

After the contact device 70 has been connected to the mating plug contacts, the connector 26 is re-closed, whereby a power and signal bushing 10 connected to the circuit board 6 projects beyond the front wall of the connector 26 when the connector 26 of the common housing 1 is closed, so that the electrical connection to the circuit board 6 can be established via a cable harness.

Figure 6:
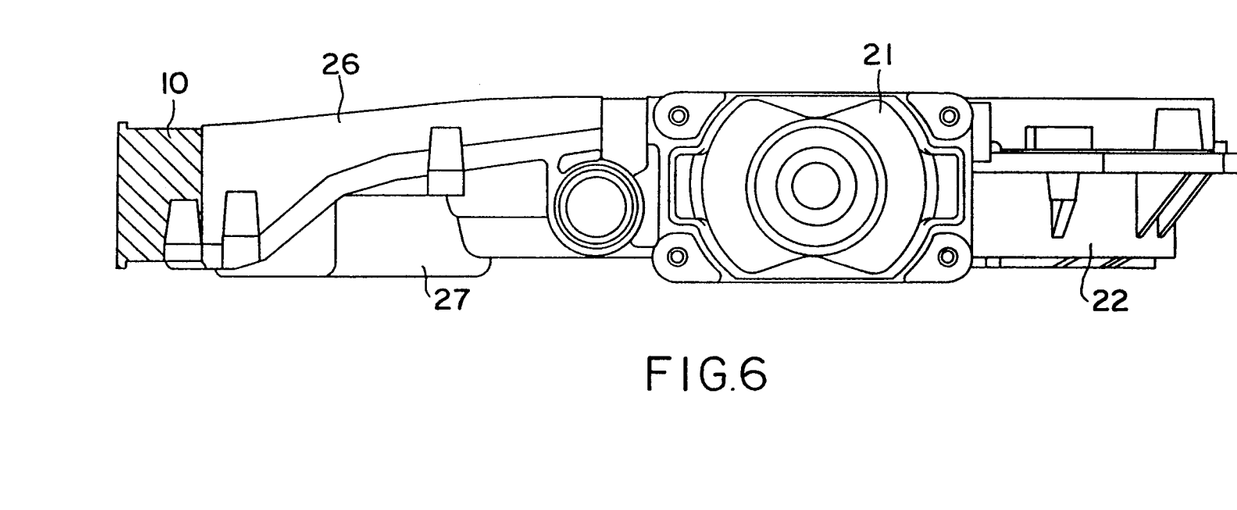
FIG. 6 shows a side view with a partial cross section through the assembly along the Line A—A of FIG. 5.

FIG. 6, a side view with a partial cross section along the line A—A according to FIG. 5, clearly shows the correspondence between the drive unit 21, 22 and the connector 26 of the common housing 1 and the location of the circuit board 6 in the connector 26, as well as the power and signal bushing 10 in relation to the location of the circuit board 6 in the connector 26.

The enclosed, compact design of the assembly is apparent in the preceding description of an embodiment of the electrically powered power window unit according to the invention. In addition to the significantly easier installation and reduction of the connecting elements of the individual assembly parts, absolute moisture tightness is achieved and the possibility of connection errors eliminated. At the same time, speed measurement for control of the drive unit during raising and lowering of the window is significantly facilitated and errors during measurement of current speed values are eliminated.

Inexpensive plugs can be used as the plug elements still necessary, since they are located in a completely water tight chamber, which eliminates corrosion problems.

Finally, due to the modular design, all sorts of electronic devices can be located on the plug-in module, so that jamming protection circuits or regulating circuits for raising or lowering of the window, as well as a combination of window controls with a central locking system is possible.

The embodiments of the invention are not restricted to the preferred embodiments described above. Rather, a number of variants are conceivable, which utilize elements of the described invention even with essentially different embodiments.

We claim:
1. Electrically powered power window unit for installation in motor vehicles, said unit comprising:
    an essentially moisture tight housing;
    a drive unit located within the housing;
    an electronic control and regulating system located within the housing, said electrically powered power window unit being controllable via the electronic control and regulating system;
    a circuit board, the electronic control and regulating system being located on the circuit board;
    a connector portion of the housing, the connector portion having an interior, the circuit board being insertable or pluggable into the connector portion;
    a power and signal bushing fastened to the circuit board, the power and signal bushing extending through the front side of the connector portion when the circuit board is inserted into the connector portion;
    an electromotor;
    the drive unit comprising a transmission; and
    the connector portion of the housing being perpendicular to the electromotor and the transmission of the drive unit.

2. Electrically powered power window unit according to claim 1, wherein the drive unit has first plug contacts, and the circuit board is insertable in the interior of the connector portion of the housing which is closable by means of a cover and, by means of a contact device is connectable to the first plug contacts of the drive unit.

3. Electrically powered power window unit according to claim 2, wherein said electrically powered power window unit has a plurality of sealing surfaces, and all the sealing surfaces are configured using two-component technology.

4. Electrically powered power window unit according to claim 1, wherein the drive unit has first plug contacts and the housing has a cover which has an interior, wherein the circuit board is fastened to the interior of the cover and is connectable to the first plug contacts of the drive unit by means of a contact device.

5. Electrically powered power window unit according to claim 4, wherein said electrically powered power window unit has a plurality of sealing surfaces, and all the sealing surfaces are configured using two-component technology.

6. Electrically powered power window unit for installation in motor vehicles, said unit comprising:
    an essentially moisture tight housing, the housing having a connector portion, the connector portion having an opening and an interior;
    a drive unit located within the housing, the drive unit having a rotor shaft and first plug contacts;
    an electronic control and regulating system located within the housing, said electrically powered power window unit being controllable via the electronic control and regulating system;
    a circuit board insertable or pluggable into the connector portion, the electronic control and regulating system being located on the circuit board;
    a plug-in module pluggable into the opening of the connector portion of the housing, the plug-in module having an outer surface and second plug contacts, the outer surface of the plug-in module for lying flat against the housing when the plug-in module is plugged into the opening, the circuit board being connected to the plug-in module, the second plug contacts being connectable to the first plug contacts of the drive unit when the module is plugged into the opening;
    a speed sensor, the speed sensor having a receiver part and a transmitter part, the transmitter part being connected to the rotor shaft of the drive unit, the speed sensor being located within the housing, the plug-in module containing the receiver part of the sensor, the receiver part, when the plug-in module is inserted into the housing, either making contact with the transmitter part or being located opposite the speed sensor without being in contact with the transmitter part;

the circuit board being connected on one side to the outer surface of the plug-in module perpendicular to the circuit board;

a plug element located opposite the outer surface, the plug element containing the receiver part of the speed sensor and the second plug contacts;

a power and signal bushing in the outer surface of the plug-in module for the connection of the electronic control and regulating system to a motor vehicle battery and a control switch; and a gasket in a groove encircling the outer surface or in a shoulder of the outer surface.

7. Electrically powered power window unit according to claim 6, wherein:

the receiver part of the speed sensor comprises two receiver parts; and the plug element has a front-mounted, center-stop for the calibration of the receiver parts of the speed sensor, which receiver parts are located on both sides of a rib and the second plug contacts connected to the rib.

8. Electrically powered power window unit according to claim 7, wherein the speed sensor comprises at least one of the following: a magnet wherein the receiver parts of the speed sensor comprise Hall sensor receivers, and the Hall sensor receivers are located on both sides of the rib and partly surround the magnet connected to the rotor shaft, or a photoelectric sensor or an inductive sensor, whereby the transmitter part of the speed sensor is connected to the rotor shaft and the receiver parts of the speed sensor are connected to the plug element of the plug-in module, whereby there are guide lugs located diagonally across from one another on the upper and lower sides of the circuit board, which lugs are slid into corresponding guide grooves in the housing.

9. Electrically powered power window unit according to claim 8, wherein said electrically powered power window unit has a plurality of sealing surfaces, and all the sealing surfaces are configured using two-component technology.

10. Electrically powered power window unit for installation in motor vehicles, said unit comprising:

a moisture tight housing, said housing having a connector portion, said connector portion having an opening and an interior;

a drive unit located within said housing, said drive unit having a rotor shaft and first plug contacts;

an electronic control and regulating system located within said housing, said electrically powered power window unit being controllable via said electronic control and regulating system;

a circuit board insertable or pluggable into said connector portion, said electronic control and regulating system being located on said circuit board;

a plug-in module pluggable into said opening of said connector portion of said housing, said plug-in module having an outer surface and second plug contacts, said outer surface of said plug-in module for lying flat against said housing when said plug-in module is plugged into said opening, said circuit board being connected to said plug-in module, said second plug contacts being connectable to said first plug contacts of said drive unit when said plug-in module is plugged into said opening;

a speed sensor, said speed sensor having a receiver part, said drive unit being connected to said speed sensor, said speed sensor being located within said housing on said plug-in module;

said speed sensor also having a transmitter part connected to said rotor shaft of said drive unit;

said plug-in module also having a plug element located opposite said outer surface of said plug-in module, said plug element containing said receiver part of said speed sensor and said second plug contacts;

said receiver part, when said plug-in module is inserted into said housing, either making contact with said transmitter part or being located opposite said speed sensor without being in contact with said transmitter part; and said receiver part of the speed sensor comprising two receiver parts, said plug element having a front-mounted, center-stop for the calibration of said receiver parts of said speed sensor, and said receiver parts being located on both sides of a rib and said second plug contacts connected to said rib.

11. Electrically powered power window unit according to claim 10, wherein said speed sensor comprises a magnet and said receiver parts of said speed sensor comprise Hall sensor receivers, said Hall sensor receivers being located on both sides of said rib and partly surround said magnet connected to said rotor shaft, whereby there are guide lugs located diagonally across from one another on the upper and lower sides of said plug-in module, which lugs are slid into corresponding guide grooves in said housing.

12. Electrically powered power window unit according to claim 11, wherein:

said circuit board is connected on one side to said outer surface of said plug-in module perpendicular to said circuit board;

said electrically powered power window unit further comprises a power and signal bushing in said outer surface of said plug-in module for the connection of said electronic control and regulating system to a motor vehicle battery and a control switch; and said electrically powered power window unit further comprises a gasket in a groove encircling said outer surface or in a shoulder of said outer surface.

13. Electrically powered power window unit according to claim 11, said electrically powered power window unit further comprising a power and signal bushing fastened to said circuit board, said power and signal bushing extending through the front side of said connector portion when said circuit board is inserted into said connector portion.

14. Electrically powered power window unit according to claim 10, wherein said speed sensor comprises a photoelectric sensor or an inductive sensor, whereby said transmitter part of said speed sensor is connected to said rotor shaft and said receiver parts of said speed sensor are connected to said plug element of said plug-in module, whereby there are guide lugs located diagonally across from one another on the upper and lower sides of said plug-in module, which lugs are slid into corresponding guide grooves in said housing.

15. Electrically powered power window unit according to claim 14, wherein:

said circuit board is connected on one side to said outer surface of said plug-in module perpendicular to said circuit board;

said electrically powered power window unit further comprises a power and signal bushing in said outer surface of said plug-in module for the connection of said electronic control and regulating system to a motor vehicle battery and a control switch; and said electrically powered power window unit further comprises a gasket in a groove encircling said outer surface or in a shoulder of said outer surface.

16. Electrically powered power window unit according to claim 14, said electrically powered power window unit further comprising a power and signal bushing fastened to said circuit board, said power and signal bushing extending through the front side of said connector portion when said circuit board is inserted into said connector portion.

17. Electrically powered power window unit according to claim 10, wherein:

said circuit board is connected on one side to said outer surface of said plug-in module perpendicular to said circuit board;

said electrically powered power window unit further comprises a power and signal bushing in said outer surface of said plug-in module for the connection of said electronic control and regulating system to a motor vehicle battery and a control switch; and said electrically powered power window unit further comprises a gasket in a groove encircling said outer surface or in a shoulder of said outer surface.

18. Electrically powered power window unit according to claim 17, said electrically powered power window unit further comprising a power and signal bushing fastened to said circuit board, said power and signal bushing extending through the front side of said connector portion when said circuit board is inserted into said connector portion.

19. Electrically powered power window unit according to claim 10, said electrically powered power window unit further comprising a power and signal bushing fastened to said circuit board, said power and signal bushing extending through the front side of said connector portion when said circuit board is inserted into said connector portion.

20. Electrically powered power window unit according to claim 10, wherein said electrically powered power window unit has a plurality of sealing surfaces, and all the sealing surfaces are configured using two-component technology.

* * * * *

UNITED STATES PATENT AND TRADEMARK OFFICE
CERTIFICATE OF CORRECTION

PATENT NO. : 5,245,258
DATED : September 14, 1993
INVENTOR(S) : Herbert BECKER, Gerhard JÜRJENS, Klaus WAGNER, Gerhard SCHELHORN, Carsten BRANDT, Bernd FREISLEBEN and Reiner KURZENDÖRFER It is certified that error appears in the above-indentified patent and that said Letters Patent is hereby corrected as shown below:

On the title page, item 75, in the Inventors section, after 'Gerhard', delete "Jürgens" and insert --Jürjens--.

Signed and Sealed this

Twentieth Day of December, 1994

Attest:

BRUCE LEHMAN

*Attesting Officer*   *Commissioner of Patents and Trademarks*